United States Patent [19]

Elrick et al.

[11] 3,984,265

[45] Oct. 5, 1976

[54] COMPOSITE PROPELLANTS HAVING IMPROVED RESISTANCE TO THERMAL OXIDATION

[75] Inventors: Donald E. Elrick, Rawlings; Harry Gilbert, Cumberland, both of Md.

[73] Assignee: Hercules Incorporated, Wilmington, Del.

[22] Filed: Dec. 4, 1968

[21] Appl. No.: 781,283

Related U.S. Application Data

[63] Continuation-in-part of Ser. No. 667,623, Sept. 6, 1967.

[52] U.S. Cl. ............................. 149/19.9; 149/19.6; 149/20
[51] Int. Cl.[2] .......................................... C06D 5/06
[58] Field of Search ............... 149/19, 19.6, 19.9, 149/20

[56] References Cited
UNITED STATES PATENTS

| | | | |
|---|---|---|---|
| 3,147,161 | 9/1964 | Abere et al. | 149/19 |
| 3,177,190 | 4/1965 | Hsieh | 260/94.2 |
| 3,305,523 | 2/1967 | Burnside | 149/19 X |
| 3,417,059 | 12/1968 | Hoffman | 149/19 |

*Primary Examiner*—Benjamin R. Padgett
*Assistant Examiner*—Edward A. Miller
*Attorney, Agent, or Firm*—Michael B. Keehan; S. Grant Stewart

[57] ABSTRACT

Composite carboxy terminated polybutadiene (CTPB) rubber base propellants, in which the CTPB inherently contains 2,2'-methylene-bis(4-methyl-6-tert-butyl)phenol (AO-2246) added during CTPB manufacture and antagonistic toward conventional antioxidants added to the CTPB propellant, are provided, which contain a synergistic (see Markush definition) antioxidant mixture highly compatible with the inherently present AO-2246. Invention also provides the antioxidant mixture per se.

17 Claims, No Drawings

COMPOSITE PROPELLANTS HAVING IMPROVED RESISTANCE TO THERMAL OXIDATION

This application is a continuation-in-part of our copending application Ser. No. 667,623, filed Sept. 6, 1967.

This invention relates to solid propellant compositions having improved resistance to thermal oxidation. In a more specific aspect this invention relates to epoxy cured composite propellants in which the binder system comprises a carboxy terminated polybutadiene base and a mixture of antioxidant type materials unexpectedly compatible therewith as an antioxidant for, and synergistically imparting resistance to thermal oxidation to, said propellant. In still another aspect this invention relates to a new antioxidant composition for composite propellants. Other aspects will be apparent in light of the accompanying disclosure and the appended claims.

Solid propellant compositiions, as propellants for projectiles, are fast burning oxidizer-fuel systems comprising a solid oxidizer, and a binder system to support the propellant ingredients uniformly throughout the propellant mass and to also serve as a fuel. Upon incorporation of all ingredients into the final propellant mixture, it (the propellant mixture) is maintained under time and temperature curing conditions to form the finished propellant product. Composite type propellants are rubber based and contain natural rubber, or synthetic rubbery polymers or copolymers as the binder component. The binder, or binder system, as it may be referred to, comprises not only the rubbery base material but also all associated ingredients to enable it to function in that capacity such as a suitable plasticizer, curing agent, catalyst when needed for curing, setting agent, antioxidant, and the like. In some instances suitable filler materials are utilized, i.e. reinforcing agents as, for example, carbon black, clays, silica, burning rate catalysts, and the like. These materials along with oxidizer component of the propellant are dispersed evenly throughout the rubbery binder component and upon curing the mixture all ingredients are evenly dispersed throughout the gel network. Curing is generally carried out after the final ingredient mixture has been emplaced in a suitable mold so that upon completion of the curing reaction the propellant is in the desired shape for use.

In our parent U.S. application above referred to, we have disclosed and claimed composite propellants, and method for their manufacture, in which the binder is formed from a carboxy terminated rubber and an epoxide curing agent. In our copending application, Ser. No. 736,929, filed June 4, 1968, we have disclosed and claimed epoxide cured composite propellants having a carboxy terminated rubber base and containing selected phenylene diamines chemically locked in the binder network as an antioxidant component.

In accordance with process set forth in our copending parent application Ser. No. 667,623, in the manufacture of the epoxy cured composite propellants the binder component is formed by reacting the carboxy terminated rubber base with a curing agent consisting of a mixture of difunctional epoxides and trifunctional epoxides wherein the mole ratio of the dioxide to trioxide introduced into the formulation is in the range of 15:1 to 1:1. The reaction is carried out in the presence of a curing catalyst of the group of chromium salts of an aliphatic carboxylic acid containing from 2 to 22 carbon atoms, chromium naphthenate, and vanadium naphthenate, the ratio of epoxy groups to carboxyl groups in the binder forming mixture being substantially in stoichiometric proportions.

Supplemental propellant ingredients commonly employed in the art in making composite propellants include oxidation inhibitors, reinforcing agents, setting agents, surfactants, ballistic modifiers, burning rate modifiers, metal fuels, plasticizers, and the like. In the manufacture of carboxy terminated rubbers for utilization as a rubber base material and composite propellants, an antioxidant is often present in the carboxy terminated rubber-forming reaction mixture, and the presence of an antioxidant is particularly important during subsequent processing to recover the carboxy terminated rubber product. The antioxidant so utilized is retained by, and is thus inherently present in, the carboxy terminated rubber product recovered for use as the propellant base, and hence is inherently present in the finished propellant. Exemplary of various antioxidants utilized in the manufacture and recovery of carboxy terminated rubber base materials for composite propellants, include phenyl-β-naphthylamine (PBNA), 2,2'-methylene-bis(4-methyl-6-tert-butyl)phenol (AO 2246), and N-1-methylpropyl-N'-phenyl-p-phenylenediamine (Flexol 5-L).

Carboxy terminated polybutadiene is the most generally utilized rubber base for composite propellants, and of the various available antioxidants, employed in its manufacture and recovery, PBNA and 2,2'-methylene-bis(4-methyl-6-tert-butyl)phenol have been most generally utilized, more often the latter.

Although the antioxidant inherently present in the carboxy terminated polybutadiene, as above described, imparts an oxidation inhibiting action to the finished propellant, it is generally necessary that additional antioxidant be added in order that the finished propellant have the requisite resistance to oxidative hardening. We have found however that when 2,2'-methylene-bis(4-methyl-6-butyl)phenol is the inherently present antioxidant in the carboxy terminated polybutadiene base, the additionally added antioxidant is often not compatible with the inherently present 2,2'-methylene-bis(4-methyl-6-tert-butyl)phenol to cumulatively provide the propellant with the expected increase in antioxidant properties. This has been true even when the particular added antioxidant is known to impart high antioxidant properties to such a propellant in the absence of the inherently present 2,2'-methylene-bis(4-methyl-6-tert-butyl)phenol.

This invention is concerned with epoxide cured composite propellants in which the rubber base component is a carboxy terminated polybutadiene inherently containing 2,2'-methylene-bis(4-methyl-6-tert-butyl)-phenol, as above described, and which contains a 3-component antioxidant composition which is not only compatible with the inherently present antioxidant material as total anti-oxidant for the propellant, but which synergistically imparts unexpectedly improved antioxidant properties thereto.

In accordance with the invention, a composite propellant is provided in which the rubber base is a carboxy terminated polybutadiene containing 2,2'-methylene-bis(4-methyl-6-tert-butyl) phenol incorporated as an antioxidant therefor prior to formation of said propellant, and in which the binder is said carboxy terminated polybutadiene cured together with an epoxide curing agent and a mixture of phenyl-β-naphthylamine (PBNA), N,N'-bis(1,4-dimethylpentyl)p-phenylenediamine (AO-443) and at least one of the group consisting of thiodiphenylamine (TDPA) and 1,3,5-trimethyl-2,4,6-tris(3,5-di-tert-butyl-4-hydroxybenzyl) benzene (Ionox) as a synergistically acting antioxidant for said propellant.

In preferred practice, the composite propellants of the invention contain, on a weight basis, from about 60 to 90 percent solid oxidizer and from about 5 to 20 percent binder. The binder component generally contains from 0.5 to 6, and preferably from 1 to 5, parts of the synergistic antioxidant mixture and from 1.0 to 1.5 parts of the inherently retained 2,2'-methylene-bis(4-methyl-6-tert-butyl)phenol, per 100 parts by weight of the carboxy terminated polybutadiene, together with the epoxy curing agent and a suitable plasticizer component. More often, in preferred practice, the propellant compositions contain from about 70 to 90 percent solid oxidizer, from 2 to 7 percent plasticizer from 5 to 16 percent metal fuel and from 5 to 20 percent binder component. From about 40 to about 95 weight percent of the binder, in preferred practice, is the carboxy terminated polybutadiene, and from about 1 to about 10 weight percent is the epoxide mixture, while the plasticizer can be present in amount from zero to about 50 weight percent, and preferably from about 20 to 40 percent by weight of the binder.

The synergistic antioxidant component mixture of the propellants of the invention generally contains each of the compounds, viz. PBNA, AO-443, and TDPA (and/or Ionox), in proportions of at least 10 parts, and often from 10 to 70 parts, per 100 parts by weight of said mixture, a weight ratio of 1:1:1 and/or :1 being often advantageously utilized.

The finished propellant of the invention in most embodiments contains one or more additional materials such as a metal fuel and ingredients commonly employed in making composite propellants such as reinforcing agents, wetting agents, surfactants, ballistic modifiers, radar attenuators, burning rate modifiers and the like. The propellant is prepared by intimately blending or mixing the ingredients using conventional techniques and standard equipment well known to those skilled in the art as suitable for the purpose. If desired, the addition of the cure catalyst to the mixture can be delayed until just prior to curing. The latter method offers the distinct advantage of giving a stable mixture which can be stored indefinitely up until the time it is needed.

The curing of the composition is conducted in the presence of the catalyst at any temperature, usually zero to 100° C., the only effect of temperature variation being to increase or decrease the rate of reaction. It is preferred to carry out the cure at temperatures in the range of about 50° to 80° C.

The carboxy terminated polybutadiene component of the binder, in preferred practice, can be produced in any known manner as for example by carrying out polymerization of the monomeric butadiene in the presence of an anionic catalyst. Such polymerizations are well known in the art, see particularly U.S. Pat. No. 3,225,089 and 3,135,716. The antioxidant (AO-2246) is generally added to the carboxy terminated polybutadiene (CTPB) prior to final recovery of the CTPB to prevent oxidative degradation when it (CTPB) is first exposed to air.

The carboxy terminated polybutadienes which are preferred propellant base materials, in practice of this invention, are those having molecular weights ranging from about 1000 to about 20,000, and preferably from about 1500 to about 10,000, a carboxy terminated polybutadiene having a molecular weight in the order of from about 1000 to 6000, and from about 0.03 to 0.10 carboxy equivalents per 100 grams polymer being particularly preferred.

The binder system of the invention is, in preferred practice, the polymeric binder formed by curing, the carboxy terminated butadiene in the presence of certain metal salt catalysts for the carboxylepoxide reaction, with an all-epoxide curing agent which is a mixture of diepoxides and triepoxides having a diepoxide; triepoxide mole ratio of from about 15:1 to 1:1, and preferably from 3:1 to 1:1. Maintenance of the ratio of the difunctional epoxides to the trifunctional epoxides within the above ranges is important to the production of propellants having a satisfactory mechanical property balance since below the ratio of 1:1 the propellant elongation is low, and above the ratio of 15:1 the propellant tensile strength is low.

The diepoxides of the mixture contain two epoxide groups per molecule and are the saturated or unsaturated aliphatic, cycloaliphatic, aromatic or heterocyclic diepoxides which also contain, if desired, non-interfering substituents. Preferred diepoxides are the aliphatic diepoxides containing 4 to 30 carbon atoms, the cycloaliphatic diepoxides containing 12 to 40 carbon atoms and the diglycidyl ethers or dihydric phenols. Typical diepoxides include butadiene dioxide; 1,2,5,6-diepoxyhexane; diglycidyl ether; diglycidyl ether of 1,3-butanediol; 1,8-bis(2,3-epoxypropoxy) octane; 1,4-bis(2,3-epoxypropoxy) cyclohexane; 1,4-bis(3,4-epoxybutoxy)-2-chlorocyclohexane; the di(epoxycyclohexanecarboxylates) of aliphatic diols exemplified by the bis(3,4-epoxycyclohexanecarboxylate) of 1,5-pentanediol, 3-methyl-1,5-pentanediol, 2-methoxymethyl-2,4-dimethyl-1,5-pentanediol, ethylene glycol, 2,2-diethyl-1,3-propanediol, 1,6-hexanediol and 2-butene-1,4-diol; the oxyalkylene glycol epoxycyclohexanecarboxylates exemplified by bis(2-ethylhexyl-4,5-epoxycyclohexane-1,2-dicarboxylate) of dipropylene glycol, bis(3,4-epoxy-6-methylcyclohexanecarboxylate) of diethylene glycol and bis(3,4-epoxycyclohexanecarboxylate) of triethylene glycol; the epoxycyclohexylalkyl epoxycyclohexanecarboxylates exemplified by 3,4-epoxycyclohexylmethyl 3,4-epoxycyclohexanecarboxylate, 3,4-epoxy-1-methylcyclohexylmethyl 3,4-epoxy-1-methylcyclohexanecarboxylate, 3,4-epoxy-2-methylcyclohexylmethyl 3,4-epoxy-2-methylcyclohexanecarboxylate, 3,4-epoxy-6-methylcyclohexylmethyl 3,4-epoxy-6-methylcyclohexanecarboxylate, (1-chloro-3,4-epoxycyclohexan-1-yl) methyl 1-chloro-3,4-epoxycyclohexanecarboxylate, (1-bromo-3,4-epoxycyclohexan-1-yl) methyl 1-bromo-3,4-epoxycyclohexanecarboxylate and (1-chloro-2-methyl-4,5-epoxycyclohexan-1-yl) methyl 1-chloro-2-methyl-4,5-epoxycyclohexanecarboxylate; epoxycyclohexylalkyl dicarboxylates exemplified by bis(3,4-epoxycyclohexylmethyl) pimelate and oxalate and bis(3,4-epoxy-6-methylcyclohexylmethyl) maleate, succinate, sebacate and adipate; epoxycyclohexylalkyl phenylene-dicarboxylates exemplified by bis(3,4-epoxycyclohexylmethyl) terephthalate; bis(3,4-epoxy-6-methylcyclohexylmethyl) diethylene glycol ether; vinyl cyclohexene dioxide; diepoxide of dicyclohexene; dicyclopentadiene dioxide; bis(2,3-epoxycyclopentyl) ether; glycidyl 2,3-epoxycyclopentyl ether; 2,3-epoxycyclopentyl 2-methylglycidyl ether; 1,2,5,6-diepoxy-3-hexyne; 1,3-bis(2,3-epoxypropoxy)benzene; 1,4-bis(2,3-epoxypropoxy) benzene; 1,3-bis(4,5-epoxypentoxy)-5-chlorobenzene; 4,4'-bis(2,3-epoxypropoxy) diphenylether; 2,2-bis(2,3-epoxypropoxyphenyl) methane; 2,2-bis [p- (2,3-epoxypropoxy) phenyl] propane, i.e., the diglycidyl ether of bisphenol A; quinoline diepoxide and the like, as well as mixtures thereof.

The triepoxides of the mixture contain three epoxide groups per molecule and are aliphatic, cycloaliphatic or aromatic triepoxides. Preferred triepoxides are the triepoxyalkanes containing 6 to 25 carbon atoms; the tri(epoxycyclohexane carboxylates) and the triglycidylethers of trihydric alcohols such as glycerol, 1,1,1-tri(hydroxymethyl) propane, 1,2,6-hexanetriol and the higher alcohols containing up to about 25 carbon atoms; and the triglycidal ethers of trihydric phenols, such as phloroglucinol, the trihydroxydiphenyl methanes and propanes, the trihydroxyaminophenols, the trisphenols; and the like as well as mixtures thereof. Typical triepoxides include triepoxyhexane; triepoxydecane; 2,3,6,7,11,12-triepoxydodecane; 2,3,5,6-diepoxy-9-epoxyethyldodecane; tris(3,4-epoxycyclohexanecarboxylate) of 1,1,1-trimethylol propane; tris(3,4-epoxycyclohexanecarboxylate) of 1,2,3-propanetriol; 2,2[2,4,4'-tris(epoxypropoxy) diphenyl] propane; 1,1-bis(glycidyloxymethyl)-3,4-epoxycyclohexane; N,N,O-tris(epoxypropyl) p-aminophenol; and the like. Epoxide mixtures containing the diglycidylethers of bisphenol A and the triepoxides of the aminophenols are particularly preferred.

For best results, both the diepoxide and the triepoxide of the mixture will be in the relatively pure state, i.e., having a purity of about 95 to 100 percent in order that all of the available carboxy groups of the rubber will be incorporated into the gel network without wastage of any appreciable number of polymer chains as dangling ends which do not contribute to the gel network.

The ratio of the epoxy groups in the epoxide mixture to the carboxyl groups of the rubber in the binder should be in substantially stoichiometric proportions. Although a slight excess of either is not harmful, it is preferred that a slight excess of epoxy groups over carboxyl groups be present in the binder, generally at a mole ratio of epoxy groups to carboxy groups within the range of from 0.9:1 to 2:1.

The reaction of the carboxy terminated polybutadiene with the above described epoxide mixture requires the presence of a catalyst which promotes the carboxy-epoxide reaction. Catalysts of this type must also have high activity in the presence of the other propellant ingredients, and must not adversely affect the desirable properties of the cured propellant, as by side reactions. The catalysts which have been found to fit all of the above requirements are chromium salts of aliphatic carboxylic acids containing 2 to 22 carbon atoms and preferably 2 to 18 carbon atoms, chromium naphthenate or vanadium naphthenate. The preferred catalysts include chromium acetate, chromium 2-ethylhexanoate, chromium neodecanoate, chromium stearate, chromium oleate, chromium naphthenate and vanadium naphthenate. The amount of catalyst necessary to promote the reaction will, of course, depend on many factors, as for example, on the particular salt employed, the binder materials and other propellant ingredients present and the cure rate desired. In general, the amount utilized will vary from a very small catalytic amount up to about 0.1 percent of the propellant composition and preferably will be from about 0.005 percent to about 0.03 percent by weight of the composition.

The solid oxidizer component of the propellants of the invention is preferably an inorganic oxidizing salt, a number of which are well known to the art. Typical of such inorganic salts are the ammonium, alkali metal, or alkaline earth metal salts of nitric perchloric, or chloric acids or mixtures thereof, and particularly such salts as ammonium perchlorate, sodium perchlorate, potassium perchlorate, magnesium perchlorate, lithium chlorate, strontium chlorate, potassium nitrate, sodium nitrate, calcium nitrate, ammonium nitrate, and the like. Other solid oxidizers such as cyclotetramethylene tetranitramine, cyclotrimethylene trinitramine, nitroguanidine, and the like can be substituted for all or part of the inorganic oxidizing salt, if desired.

The propellants of the invention are prepared in any suitable manner by intermittently blending or mixing the ingredients using conventional techniques and standard equipment known to those skilled in the art for that purpose. If desired, when a curing catalyst is utilized, the catalyst addition to the ingredient mixture can be delayed until just prior to cure to afford the advantage of a stable mixture which can be stored indefinitely up until the time that it is needed.

The epoxide-carboxy terminated butadiene curing reaction is generally conducted in the presence of a catalyst, as described, inasmuch as the curing time, in absence of a curing catalyst, is in most instances unduly long.

The invention is illustrated with reference to the following examples, all parts and percentages set forth therein being on a weight basis.

EXAMPLE 1

Preparation of Basic Propellant Formulations

Six basic propellant formulations, viz. Nos. A-F inclusive, were prepared for testing, as control and in modified form, for mechanical properties before and after aging, in the evaluation of several anitoxidant components including the synergistic antioxidant system of the invention.

In the preparation of basic formulation A, the binder system was prepared by forming a solution of 0.07 to 0.12 part chromium, 2-ethyl hexanoate having a chromium content of 10.9 percent, in 64.56 parts of a carboxy terminated polybutadiene having a molecular weight of about 5000, a specific gravity of about 0.91 g./ml. at 60/60° F., a viscosity of 300 poises at 77° F. and a carboxyl content of about 0.033 equivalents per 100 grams polymer. The carboxylated polybutadiene contained 1.34 weight percent of 2,2'-methylene-bis(4-methyl-6-tert-butyl)phenol added as an antioxidant during its recovery from the reaction mixture in which it was formed, i.e. prior to its utilization as a binder component and thus inherently present in the carboxylated polybutadiene prior to incorporation of the latter into the propellant.

The epoxide curing agent, for reaction with the carboxy terminated polybutadiene, was then added with stirring together with 16 parts of dioctyl adipate and 15.88 parts of a liquid polybutadiene as plasticizers for the binder. The epoxide curing agent was composed of a mixture of 2.98 parts DER-332 (the condensation product of bisphenol A and epichlorohydrin) and 0.46 part ERL-0510 (N,N,O-tris(epoxypropyl)p-aminophenol) and the resulting epoxide:COOH equivalency was 1.00.

The basic propellant formulation A was prepared in a Baker Perkins vertical mixer (driven by an air motor and heated to 65° C. by water) by mixing the above described binder solution in the order given with 5 percent powdered aluminum (average particle size of 10 microns), micro atomized ammonium perchlorate (average particle size, 10 microns), unground ammonium perchlorate (average particle size, 200 microns) and spherical ammonium perchlorate (average particle size, 400 microns), in respective proportions of about 20:32:31 to produce a total of 83 percent trimodal ammonium perchlorate.

After a total mixing period of 45 minutes, the resulting slurry was transferred to a wax-coated cardboard container, the inside length, width and height dimensions of which were 4 × 1¼ × 6 inches, respectively, and therein deaerated in a vacuum desiccator at about 75° C. to a pressure of 1 mm. for 30 minutes followed by curing in a forced air oven at 60° C.

Basic formulation B was prepared in accordance with the general procedure above described with reference to formulation A except that (1) the trimodal perchlorate included ground ammonium perchlorate of average particle size of 50 microns in lieu of micro atomized ammonium perchlorate of average particle size, 10 microns; (2) $Fe_2O_3$ was incorporated into the propellant; and (3) there were some differences in ingredient proportions. In preparation of basic formulation B, the $Fe_2O_3$ was of average particle size of <1 micron and was added to the binder solution in the Baker Perkins mixer.

Basic formulation C was prepared in accordance with procedure described above with reference to formulation B, differing therefrom only in respect of the presence of 0.5 percent $Cr_2O_3$ in lieu of 0.5 percent $Fe_2O_3$ added to the binder solution in the mixer.

Basic formulation D was prepared in accordance with procedure described with reference to formulation C except for (1) the addition of three parts of a 3-component antioxidant system of the invention to the binder solution just prior to addition of the epoxy curing agent thereto, (2) a different ratio of plasticizer ingredients, and (3) certain other binder solution ingredient proportions.

Basic formulation E was prepared in accordance with procedure above described with reference to formulation C except for (1) certain differences in ingredient proportions, (2) particle size of aluminum, and (3) the additon of 1 and 4 parts respectively of $MoO_3$ (average particle size, <1 micron) and oxamide (average particle size, 15 microns) to the binder solution in the Baker Perkins mixer.

Basic formulation F was prepared in accordance with procedure described with reference to basic formulation E except that the binder solution was that described with reference to formulation D.

Basic formulations A–F inclusive, compared as above described, are summarized in Tables 1 and 1A following:

TABLE 1

| Ingredient* | Average Particle Size Maximum | Basic Propellant formulations, wt. percent | | | | | |
|---|---|---|---|---|---|---|---|
| | | A | B | C | D | E | F |
| AP | 400 | 31 | 31 | 31 | 31 | 57 | 57 |
| AP | 200 | 32 | 19.5 | 19 | 19 | 10 | 10 |
| AP | 50 | — | 30 | 30 | 30 | 5 | 5 |
| AP | 10 | 20 | — | — | — | — | — |
| Al | 10 | 5 | 6 | 6 | 6 | — | — |
| Al | 30 | — | — | — | — | 10 | 10 |
| $Fe_2O_3$ | — | — | 0.5 | 1.0 | 1.0 | — | — |
| $MoO_3$ | — | — | — | — | — | 1 | 1 |
| Oxamide | — | — | — | — | — | 4 | 4 |
| Binder I | | 12 | — | — | — | — | — |
| Binder II | | — | 13 | 13 | — | 13 | — |
| Binder III | | — | — | — | 13 | — | 13 |

*AP = Ammonium Perchlorate; Al = Aluminum

TABLE 1A

| Binder Solutions I, II and III of Table 1 | | | |
|---|---|---|---|
| | Wt. percent | | |
| Binder Solution | I | II | III |
| Carboxy Terminated Polybutadiene (CTPB) | 64.56 | 66.34 | 66.34 |
| DER-332 | 2.98 | 3.17 | 3.18 |
| ERL-0510 | 0.46 | 0.49 | 1.09 |
| DOA[1] | 16.00 | 15.00 | 22.00 |
| PBD[2] | 15.88 | 14.88 | 4.27 |
| Chromium octanoate | 0.12 | 0.12 | 0.12 |
| Synergistic AO[3] | — | — | 3.0 |
| Epoxy/COOH ratio | 1.00 | 1.03 | 1.30 |

[1]dioctyl adipate
[2]liquid polybutadiene
[3]a mixture of equal parts of AO 443, PBNA and TDPA

EXAMPLE 2

Mechanical properties of cured propellant formulations A, C and E of Example 1, before and after aging, were evaluated by machining "dumbbell" shaped test strips therefrom (1.9 inches effective gage length × ⅜ inch width × ¼ inch thickness × ½ inch radius) followed by drying over silica gel for 3 days and then age testing the specimens. Similar tests were also carried out on dumbbell samples similarly prepared from cured, but modified formulations A and C. Data summarizing these tests are set forth in Table 2 following:

TABLE 2

| Test No. | Propellant Tested | | | Mechanical Properties Measured at 77°F. | | | | | | |
|---|---|---|---|---|---|---|---|---|---|---|
| | Basic Formulation[4] (See Table 1) | Initial CTPB Antioxidant[3] | Oxide and/or Oxamide (If any)[3] | Before Aging | | | After Aging 2 weeks at 205°F. | | | Strain Retention Percent[2] |
| | | | | Modulus PSI | Tensile Strength PSI | Elongation at Max.Stress Percent | Modulus PSI | Tensile Strength PSI | Elongation at Max.Stress Percent | |
| 1 | A | AO-2246, 0.9% | None | 435 | 98 | 35.5 | 1920 | 105 | 7 | 20 |
| 2 | C | AO-2246, 0.9% | 1%$Fe_2O_3$ | 620 | 113 | 38.5 | 2190 | 101 | 6 | 16 |
| 3 | E | AO-2246, 0.9% | 1%$MoO_3$ 4% Oxamide | 735 | 92 | 57.5 | 3600 | 107 | 4.5 | 8 |
| | Modified[4] | | | | | | | | | |
| 4 | A(mod.)[1] | PBNA, 1.3% | None | 570 | 98 | 36 | 560 | 101 | 35 | 97 |
| 5 | C(mod.)[1] | PBNA, 1.3% | 1% $Fe_2O_3$ | 580 | 100 | 33.5 | 565 | 104 | 29.5 | 88 |

[1]A(mod.) and C(mod.) are respectfully the same as basic formulations A and C, except for the rubber base component which was carboxy terminated polybutadiene containing the PBNA added, in lieu of AO-2246, during manufacture and recovery of the carboxy terminated polybutadiene for incorporation into the propellant formulation. The carboxy terminated polybutadiene, so recovered, had an equivalent weight of 1950 or a carboxyl content of 0.0513 equivalents per 100 grams.
[2]Quotient in percent of the elongations at maximum stress after and before aging.
[3]Wt. percent of the propellant binder.
[4]The formulations of tests 1, 2 and 3 were made from the same lot of CTPB (inherently containing AO-2246, lot number 2 AP6; and the formulations of tests 4 and 5 were made from the same lot of CTPB (inherently containing PBNA, lot number 55M).

The data of Table 2 particularly with reference to strain retention values observed, illustrate the small degree of resistance to oxidative hardening imparted to the above composite propellants by the inherently present 2,2'-methylene-bis(4-methyl-6-tert-butyl)phenol (AO-2246) in the carboxy polybutadiene rubber base, i.e. the AO-2246 having been retained in the carboxy terminated polybutadiene following its recovery from the reaction mixture in which it was formed, and hence inherently present in the propellant. Thus even in the absence of a metal oxide, a strain retention of only 20 percent (Test 1) was observed; and even lower strain retention values were obtained in presence of 1 percent $Cr_2O_3$ (16 percent, Test 2) and 1 percent $MoO_3$ with 4 percent oxamide (8 percent, Test 3). These latter, and lower, values are expected, it being well known that metal oxides normally impair antioxidant activity of antioxidant agents in composite propellants.

Strain retention is a basic standard for determination of resistance to oxidative hardening. Strain retention is a quotient in terms of percentage, of the elongations at maximum stress after and before aging a specimen. The higher the strain retention value the less is the oxidative hardening that has taken place during aging and hence the higher the strain retention value the greater is the resistance to oxidative hardening imparted by the antioxidant material.

As further shown in Table 2, 2.0 percent PBNA as the inherently present antioxidant in the modified formulation A (Test 4) imparts high resistance to oxidative hardening as shown by the strain retention value, 97 percent. Similarly as shown with reference to modified formulation C (Test 5) even when 1 percent $Fe_2O_3$ is also present, strain retention value, though decreased, is still high, i.e. 88 percent. Tests 4 and 5 demonstrate the high antioxidant activity of PBNA in composite propellants when AO-2246 is absent from the formulation. However, as shown hereinafter, PBNA in composite propellants containing AO-2246 fails to impart the expected antioxidant activity and hence it is incompatible with the inherently present AO-2246 in that regard.

EXAMPLE 3

Several portions of basic propellant formulation A modified to contain different contents of PBNA as an antioxidant in addition to the inherently present AO-2246, were prepared; and dumbbell type specimens taken therefrom, in the same manner as described with reference to Example 2, were then tested for mechanical properties before and after aging.

Similarly obtained dumbbell samples of cured, but modified, propellant formulation A were also tested for mechanical properties. Data summarizing these tests are set forth in Table 3 following

TABLE 3

| Test No. | Propellant Tested | | Mechanical Properties Measured at 77°F. | | | | | | |
|---|---|---|---|---|---|---|---|---|---|
| | Basic Formulation[1] (See Table 1) | PBNA Added During Mixing[2], Wt. Percent | Before Aging | | | After Aging 2 weeks at 205°F.[3] | | | Strain Retention Percent[4] |
| | | | Modulus PSI | Tensile Strength PSI | Elongation at Max.Stress Percent | Modulus PSI | Tensile Strength PSI | Elongation at Max.Stress Percent | |
| 6 | A | None | 435 | 98 | 35.5 | 1920 | 105 | 7 | 20 |
| 7 | A | 0.1 | 440 | 100 | 33.5 | 1870 | 130 | 9 | 27 |
| 8 | A | 0.5 | 480 | 102 | 35 | 1540 | 95 | 8 | 23 |
| 9 | A | 1.5 | 280 | 77 | 38.5 | 1560 | 144 | 12.5 | 32 |
| 10 | A | 3.0 | 780 | 108 | 24.5 | 3025 | 243 | 10.5 | 43 |
| | A Modified | | | | | | | | |
| 11 | AO-2246 PBNA[5] | None 1.3 | 565 | 98 | 36 | 625 | 101 | 35 | 97 |
| 12 | AO-2246[6] | 1.3 | 870 | 116 | 28.5 | 1900 | 140 | 12.5 | 44 |

TABLE 3-continued

| | Propellant Tested | | Mechanical Properties Measured at 77°F. | | | | | | |
|---|---|---|---|---|---|---|---|---|---|
| | Basic | | Before Aging | | | After Aging 2 weeks at 205°F.[3] | | | |
| Test No. | Formulation[1] (See Table 1) | PBNA Added During Mixing[2], Wt. Percent | Modulus PSI | Tensile Strength PSI | Elongation at Max.Stress Percent | Modulus PSI | Tensile Strength PSI | Elongation at Max.Stress Percent | Strain Retention Percent[4] |
| | PBNA[5] | 1.3 | | | | | | | |

[1]CTPB of all basic formulations of Table 1 when formulation not modified, contained 1.34 wt. percent AO-2246 prior to incorporation of the CTPB with the propellant formulation (0.9 wt. percent based on propellant binder), and was taken from lot number 2 AP6.
[2]PBNA added just prior to addition of epoxy curing agent to binder solution; wt. percent based on the propellant binder.
[3]Two weeks in forced air oven in aluminum can with porous metal closure.
[4]See footnote 2, Table 2.
[5]Inherently present in CTPB prior to incorporation of CTPB into propellant formulation; wt. percent based on the propellant binder. The formulations of tests 11 and 12 were made from CTPB of the same lot (inherently containing PBNA, lot number 55M).
[6]AO-2246 added prior to addition of epoxy curing agent to binder solution. No other AO-2246 present; wt. percent of the propellant binder.

The tests of Table 3 again demonstrate the low resistance to oxidative hardening imparted to the composite formed. Data summarizing the tests are set forth in Table 4 following:

TABLE 4

| | Propellant Tested | | Mechanical Properties Measured at 77°F. | | | | | | |
|---|---|---|---|---|---|---|---|---|---|
| | Basic Formulation A[1] | | Before Aging | | | After Aging 2 weeks at 205°F. | | | |
| Test No. | Modified by Addition of Antioxidant Mixture[2] | Wt.Percent | Modulus PSI | Tensile Strength PSI | Elongation at Max.Stress Percent | Modulus PSI | Tensile Strength PSI | Elongation at Max.Stress Percent | Strain Retention Percent |
| 13 | Ionox[3] | 1.0 | 580 | 122 | 38.5 | 745 | 142 | 28.5 | 74 |
| | AO-443 | 1.0 | | | | | | | |
| | PBNA | 1.0 | | | | | | | |
| 14 | Ionox[3] | 0.1 | 715 | 150 | 35.5 | 735 | 144 | 31 | 89 |
| | AO-443 | 1.0 | | | | | | | |
| | PBNA | 1.0 | | | | | | | |
| | TDPA | 1.0 | | | | | | | |
| 15 | Ionox[3] | 0.1 | 375 | 77 | 39.5 | 680 | 102 | 20.5 | 52 |
| | AO-443 | 1.0 | | | | | | | |
| | PBNA | 1.0 | | | | | | | |
| | HPT[4] | 1.0 | | | | | | | |

[1]See Table 1. The formulations of tests 13, 14 and 15 were made from the same lot of CTPB (inherently containing AO-2246, lot number 46,156).
[2]Added to binder solution just prior to addition of epoxide curing agent. Wt. percent based on propellant binder.
[3]1,3,5-trimethyl-2,4,6-tris(3,5-di-tert-butyl-4-hydroxybenzyl)benzene
[4]Hexamethylphosphoric triamide propellant by the inherently present 2,2'-methylene-bis(4-methyl-6-tert-butyl)phenol; and further, the incompatibility of the added PBNA with 2,2'-methylene-bis(4-methyl-6tert-butyl)phenol, in contrast to the high antioxidant activity for PBNA, in the absence of the 2,2'-methylene-bis(4-methyl-6-tert-butyl)phenol.

Thus, as shown by Tests 6–10 of Table 3, by the addition of 0.1 to 3.0 percent PBNA to the basic formulation A, strain retention was increased from 27 to 43 percent as compared with a strain retention of 97 percent (Test 11) obtained with 1.3 percent PBNA when there was no 2,2'-methylene-bis(4-methyl-6-tert-butyl) phenol (AO-2246) present. Test 12 Table 3 demonstrates the antagonism of added AO-2246 with the inherently present PBNA, viz., a strain retention of 44 percent with 1.3 percent each of AO-2246 and PBNA in contrast to 97 percent strain retention retained in the absence of AO-2246 (Test 11).

EXAMPLE 4

Three cured modified propellant formulations A were prepared in accordance with procedure therefor described in Example 1, including addition of a synergistic antioxidant composition of the invention to the binder solution just prior to the addition of the epoxy curing agent. Mechanical properties for each propellant formulation were determined by machining and drying dumbbell strips of size, and in the manner, described for preparation of dumbbell samples of Examples 2 and 3, and then age testing the specimens so formed. Data summarizing the tests are set forth in Table 4 following:

The data of Table 4 demonstrate high strain retention imparted to composite propellants of the invention by a synergistic antioxidant mixture component thereof. Thus, Test 13 which illustrates one synergistic antioxidant mixture of the invention, viz., Ionox, AO-443 and PBNA, shows a strain retention value of 74 percent for the formulation. Similarly, Test 14 illustrating another synergistic antioxidant mixture of the invention, viz., Ionox, AO-443, PBNA and TDPA, shows a still higher strain retention of 89 percent. On the other hand, Test 15 illustrates a four-component antioxidant mixture which is the same as that of Test 14 except that it contains HPT in lieu of TDPA; and Test 15 showing a strain retention value of only 52 percent, points to an adverse effect of HPT on what otherwise would be an Ionox-AO-443-PBNA synergistic mixture of the invention.

EXAMPLE 5

Several cured modified propellant formulations B were prepared in accordance with procedure of Example 1, including the addition of modifying amounts of antioxidants to the binder solution prior to addition of the epoxide curing agent. A cured unmodified formulation B was also prepared in accordance with the procedure of Example 1.

Mechanical properties of the various cured propellant formulations were evaluated. In a first series of tests, mechanical properties were determined by machining dumbbell samples from the cured propellant, each sample prepared as described with reference to Example 2 except that effective gauge length was 2.7 inches and thickness was ½ inch, and age testing the dumbbell specimen thus formed. In another series of tests, mechanical properties of propellant blocks were evaluated, i.e. the entire test block was aged and then, after removal of an outermost portion of said block of 1 inch depth, dumbbell samples (½ inch thick) were taken from the block and directly tested for mechanical properties. Data summarizing these tests are set forth in Tables 5 and 5A following:

before and after aging 32 days at 175° F. Test 23 illustrates the high degree of resistance to oxidation imparted by the now-preferred antioxidant mixture, viz., PBNA, AO-443 and TDPA, in the interior of a block, high strain retention being obtained after aging at 40 days at 215° F. as measured at both temperature levels, i.e. 77° F. and 170° F.

The data of Table 5 and 5A demonstrate excellent strain capabilities at −70° F. based on time-temperature superposition data used in stress analysis, i.e.

TABLE 5

| Test No. | Propellant Surface Tests | | | |
|---|---|---|---|---|
| | 16 | 17 | 18 | 19 |
| Modification of Formulation B[1] (Table 1) | | | | |
| Antioxidant Added, percent[2] | None | PBNA, 1.0 | PBNA, 1.0 AO-443, 1.0 Santo-white, 1.0[3] | PBNA, 1.0 AO-443, 1.0 TDPA, 1.0 |
| Mechanical Properties | | | | |
| Before Aging | | | | |
| Measured at 77°F. | | | | |
| Modulus, percent | 645 | 535 | 445 | 615 |
| Tensile Strength, percent | 110 | 112 | 108 | 128 |
| Elongation, percent (at max.stress) | 36.5 | 44.5 | 51 | 43.5 |
| Measured at 170°F. | | | | |
| Modulus, percent | 251 | 230 | 123 | 264 |
| Tensile Strength, percent | 49 | 52 | 50 | 61 |
| Elongation, percent (at max.stress) | 26.5 | 32.5 | 39.5 | 34.5 |
| After Aging 32 Days, 175°F. | | | | |
| Measured at 77°F. | | | | |
| Modulus, percent | 1430 | 805[4] | 780 | 700 |
| Tensile Strength, percent | 125 | 122[4] | 148 | 146 |
| Elongation, percent (at max.stress) | 12.5 | 26[4] | 29.5 | 37.5 |
| Strain Retention, percent | 34 | 58 | 58 | 86 |
| Measured at 170°F. | | | | |
| Modulus, percent | 928 | 489[4] | 396 | 355 |
| Tensile Strength, percent | 56 | 56[4] | 64 | 72 |
| Elongation, percent (at max.stress) | 7.5 | 15.5[4] | 20.5 | 27.5 |
| Strain Retention, percent | 28 | 48 | 52 | 81 |

Footnotes 1–3 inclusive apply to both Tables 5 and 5A, and are set forth following Table 5A.
[1]The formulation of all tests of Tables 5 and 5A were made from the same lot (inherently containing AO-2246, lot number 2 AP6).
[2]Added just prior to addition of epoxy curing agent to binder solution. Wt. percent based on propellant binder.
[3]4,4′ Thio-bis(6-tert-butyl-meta-cresol).
[4]Aged 16 days at 175°F. in forced air oven in can with loosely fitting cover.

TABLE 5A

| Test No. | Propellant Block Tests | | | |
|---|---|---|---|---|
| | 20 | 21 | 22 | 23 |
| Modification of Formulation B[1] (Table 1) | | | | |
| Antioxidant Added, percent[2] | None | PBNA, 1.0 | PBNA, 1.0 AO-443, 1.0 Santo-white, 1.0 | PBNA, 1.0 AO-443, 1.0 TDPA, 1.0 |
| Mechanical Properties, cont'd | | | | |
| After Aging 40 Days, 215°F. | | | | |
| Measured at 77°F. | | | | |
| Modulus, percent | 645 | 530 | 575 | 400 |
| Tensile Strength, percent | 89 | 103 | 128 | 118 |
| Elongation, percent (at max.stress) | 23 | 31 | 32.5 | 42.5 |
| Strain Retention, percent | 63 | 70 | 64 | 98 |
| Measured at 170°F. | | | | |
| Modulus, percent | 405 | 311 | 283 | 196 |
| Tensile Strength, percent | 37 | 41 | 36 | 42 |
| Elongation, percent (at max.stress) | 13.5 | 19 | 18 | 31.5 |
| Strain Retention, percent | 51 | 58 | 45 | 91 |

[1]The formulation of all tests of Tables 5 and 5A were made from the same lot (inherently containing AO-2246, lot number 2 AP6).
[2]Added just prior to addition of epoxy curing agent to binder solution. Wt. percent based on propellant binder.
[3]4,4′ Thio-bis(6-tert-butyl-meta-cresol).

Formulation B of Table 5, illustrated in unmodified form in Example 1, contains 0.5 $Fe_2O_3$. $Fe_2O_3$ is well known to impair antioxidant activity of antioxidant agents in composite propellants. The data of Example 5 demonstrate nevertheless the now-preferred antioxidant mixture, i.e. PBNA, AO-443, and TDPA of Test 19 to impart high oxidative hardening resistance in the presence of $Fe_2O_3$. The preferred antioxidant mixture is highly effective as demonstrated by the high strain retention values observed at both 77° F. and 170° F. which indicate strain at 170° F. (0.0074 in./in./min.) strain rate to be approximately equal to that at −70° F. at a very low ($10^{-10}$ in./in./min.) strain rate. Thus as shown in Table 5 the formulation of Test 19, containing a now-preferred synergistic antioxidant mixture, after aging 32 days at 175° F. still had an elongation of 27.5 percent (retention, 81 percent) at 170° F. Similarly, the same formulation (see Test 23 of Table 5A, containing the now-preferred synergistic antioxidant mixture of the invention) shows a high strain retention value for the propellant block interior portions and hence demonostrates superiority of that propellant over the others shown in Table 5A.

EXAMPLE 6

Four cured propellant formulations A (formulation A, Table 1) were prepared in accordance with the procedure of Example 2 and were each modified during the preparation by addition of an antioxidant material to the binder solution just prior to addition of the epoxy curing agent thereto. The formulations so prepared were tested for mechanical properties before and after aging as summarized by the data set forth in Table 6 following:

As already mentioned herein, metal oxide ingredients of composite propellant formulations adversely affect activity of antioxidants therein. However, the synergistic antioxidant mixtures of the invention exhibit greater than expected composite propellant antioxidant activity in the presence of metal oxide ingredients. Thus, a series of cured propellant formulations of at least one of A, B, C, D, E and F of Table 1 were prepared in accordance with procedure of Example 1 and in several instances were modified by the addition of the now-preferred antioxidant composition of the invention, viz., AO-443 (or Eastozone 33), PBNA and TDPA, to the binder solution just prior to addition of the epoxy curing agent. Mechanical properties were determined

TABLE 6

Modification of Formulation A[1] (Table 1) by Addition of Antioxidants
Mechanical Properties Measured at 77°F.

| | | Before Aging | | | After Aging at 205°F. | | | Strain |
|---|---|---|---|---|---|---|---|---|
| Test No. | Antioxidant Added[2] Wt. Percent | Modulus PSI | Tensile Strength PSI | Elongation Percent | Modulus PSI | Tensile Strength PSI | Elongation Percent | Retention Percent |
| 24 | Eastozone[3], 1.0 PBNA, 1.0 TDPA, 1.0 | 620 | 131 | 34 | 1315 | 168 | 18.5 | 54 |
| 25 | TDPA, 3.0 | 925 | 169 | 31 | 1885 | 206 | 15 | 48 |
| 26 | PBNA, 3.0 | 810 | 138 | 28.5 | 1820 | 169 | 13 | 46 |
| 27 | Eastozone[3], 3.0 | 780 | 180 | 24.5 | 3025 | 243 | 10.5 | 43 |

[1]The formulations of tests 24–27 inclusive made from CTPB of the same lot (inherently containing AO-2246, lot number 2 AP6)
[2]Added just prior to addition of epoxy curing agent to binder solution. Wt. percent based on propellant binder.
[3]N,N'-bis(1,4-Dimethylpentyl)p-phenylenediamine.

As shown in Table 6, the propellant of Test 24 contained, as the added antioxidant, the antioxidant mixture for each formulation, as summarized by the data set forth in Table 7.

TABLE 7

Activity of Synergistic Antioxidant Mixture in Presence of Metal Oxide
Mechanical Properties Measured at 77°F.

| | | | | Before Aging | | | After Aging 2 weeks at 205°F. | | | Strain |
|---|---|---|---|---|---|---|---|---|---|---|
| Test No. | Basic Formulation[1] (See Table 1) | Metal Oxide Wt. Percent | Antioxidant Added[2] 3 Percent | Modulus PSI | Tensile Strength PSI | Elongation Percent | Modulus PSI | Tensile Strength PSI | Elongation Percent | Retention Percent |
| 28 | A | None | None | 435 | 98 | 35.5 | 1920 | 105 | 7 | 20 |
| 29 | A[3] | None | Yes | 640 | 131 | 34 | 1315 | 168 | 18.5 | 54 |
| 30 | C | Fe$_2$O$_3$,1% | None | 620 | 112 | 38.5 | 2190 | 101 | 6 | 16 |
| 31 | D | Fe$_2$O$_3$,1% | Yes | 410 | 101 | 45.5 | 1040 | 121 | 19.5 | 43 |
| 32 | D | Fe$_2$O$_3$,1% | Yes | 800 | 123 | 41 | 1380 | 151 | 18.5 | 45 |
| 33 | B[4] | Cr$_2$O$_3$,.5% | None | 340 | 96 | 44.5 | 1800 | 115 | 8 | 18 |
| 34 | B[4] | Cr$_2$O$_3$,.5% | Yes | 275 | 82 | 49 | 700 | 125 | 26 | 53 |
| 35 | E | MoO$_3$, 1% | None | 735 | 92 | 57.5 | 3600 | 107 | 4.5 | 8 |
| 36 | F | MoO$_3$, 1% | Yes | 415 | 66 | 65 | 670 | 88 | 37 | 57 |

[1]The formulations of tests 28–36 inclusive made from CTPB of the same lot (inherently containing AO-2246, lot number 2 AP6).
[2]"Yes" indicates antioxidant was added (just prior to addition of epoxy curing agent in binder), and was in each instance a now-preferred synergistic antioxidant mixture, viz., 1 percent each of N,N'-bis(1,4-Dimethylpentyl)p-phenylenediamine, PBNA and Thiodiphenylamine. Wt. percent based on propellant binder.
[3]Except that binder III of Table 1A was utilized in place of binder I (Table 1A).
[4]Modified to contain Cr$_2$O$_3$ in lieu of Fe$_2$O$_3$.

ture of 1 percent each of Eastozone, PBNA, and TDPA, and the propellants of each of Tests 25, 26 and 27 contained 3 percent each of TDPA, PBNA and Eastozone. Each propellant of Tests 24–27 thus contained 3 percent added antioxidant.

However, the observed strain retention of the propellant of Test 24, i.e. containing 1 percent each of the antioxidant ingredient materials, was higher (54) than that of each of the propellants of Tests 25, 26 and 27 each containing 3 percent of one of the antioxidant propellant ingredients of Test 24. The data of Table 6 thus demonstrate a significantly greater strain retention imparted by the mixture than by the same proportion of any of the individual ingredients thereof, and hence a synergism of the now-preferred antioxidant composition of the invention.

The data of Table 7 demonstrate substantially no variance in strain retention values (53, 57) when the formulation contains Cr$_2$O$_3$ or MoO$_3$; and a somewhat reduced, but higher than expected, strain retention value in the presence of Fe$_2$O$_3$ (43, 45). The data also demonstrate the marked increase in strain retention value (54) imparted to the formulation devoid of any added antioxidant, except of course the AO-2246 inherently present in the CTPB binder component as described herein.

In the preceding tables, lot numbers have been shown for the different CTPB components to identify each with the individual batch in which it was formed, and from which it was recovered, during its manufacture. This has been done inasmuch as, when comparing data of the above tables, consideration can then be given to any minor variations that may be attributable to differences in batch characteristics often due to presence, from time to time, of trace amounts of contaminants in the manufacturing system, as for example, such presence of trace amounts of transitional metal contaminants.

As will be evident to those skilled in the art, various modifications can be made or followed, in the light of the foregoing disclosure and discussion, without departing from the spirit or scope of the disclosure or from the scope of the claims.

What we claim and desire to protect by Letters Patent is:

1. In a composite propellant in which the rubber base is a carboxy terminated polybutadiene, and said carboxy terminated polybutadiene contains 2,2'-methylene-bis(4-methyl-6-tert-butyl) phenol as an antioxidant therefor, the improvement comprising, as the binder component of said propellant, said carboxy terminated polybutadiene and an epoxy curing agent therefor cured together with a mixture of phenyl-beta-naphthylamine, N,N'-bis(1,4-dimethylpentyl)p-phenylenediamine and at least one of the group consisting of thiodiphenylamine and 1,3,5-trimethyl-2,4,6-tris(3,5-di-tert-butyl-4-hydroxybenzyl)benzene as an antioxidant for said propellant.

2. A propellant of claim 1 wherein the ingredients of said antioxidant mixture are phenyl-beta-naphthylamine, N,N'-bis(1,4-dimethylpentyl)p-phenylenediamine and thiodiphenylamine.

3. A propellant of claim 1 wherein the ingredients of said antioxidant mixture are phenyl-beta-naphthylamine, N,N'-bis(1,4-dimethylpentyl)p-phenylenediamine and 1,3,5-trimethyl-2,4,6-tris(3,5-di-tert-butyl-4-hydroxybenzyl)benzene.

4. A propellant of claim 1 containing from 5–20 weight percent of said binder component.

5. A propellant of claim 1 in which said antioxidant mixture contains each of said ingredients in a proportion within the range of from 10–70 parts per 100 parts by weight of said mixture.

6. A propellant of claim 5 wherein the proportions of each of said ingredients are substantially the same.

7. A propellant of claim 1 wherein the mole ratio of epoxy groups to carboxy groups introduced into said propellant is within the range of from 0.9:1 to 2:1.

8. A propellant of claim 1 containing from about 60 to about 90 weight percent of a solid oxidizer component.

9. A propellant of claim 7 wherein said epoxy curing agent introduced into said propellant is a mixture of difunctional epoxides and trifunctional epoxides, and wherein the mole ratio of the dioxide to trioxide is within the range of from 15:1 to 1:1.

10. A propellant of claim 8 wherein the solid oxidizer component is ammonium perchlorate.

11. A propellant of claim 10 containing from 70–90 weight percent of said ammonium perchlorate and from about 5 to 10 weight percent of a metal fuel.

12. A propellant of claim 2 in which said antioxidant mixture contains each of said ingredients in a proportion within the range of from 10–70 parts per 100 parts by weight of said mixture.

13. A propellant of claim 12 wherein the proportions of each of said ingredients are substantially the same.

14. A propellant of claim 12 wherein said binder component contains on a weight basis from 1.0 to 1.5 parts of said 2,2-methylene-bis(4-methyl-6-tert-butyl)-phenol per 100 parts of said carboxy terminated polybutadiene.

15. A propellant of claim 14 wherein said binder component contains, on a weight basis, from 0.5 to 6 parts by weight of said antioxidant mixture per 100 parts of said carboxy terminated polybutadiene.

16. A propellant composition of claim 15 containing, on a weight basis, from 70 to 90 percent solid oxidizer, from 2 to 7 percent plasticizer from 5 to 16 percent metal fuel, and from 5 to 20 percent of said binder; and said binder containing from 40 to 95 percent of said carboxy terminated polybutadiene.

17. A propellant composition of claim 16 wherein said solid oxidizer is ammonium perchlorate, and said metal fuel is particulate aluminum.

* * * * *